D. F. COMSTOCK ET AL

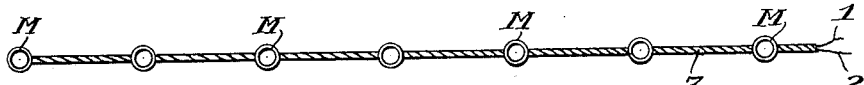
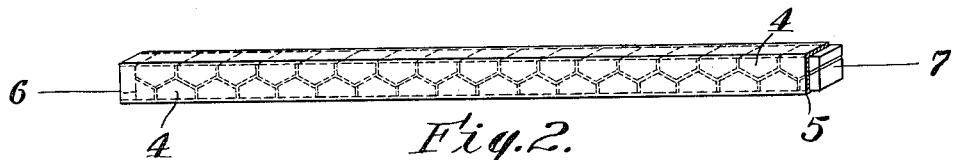
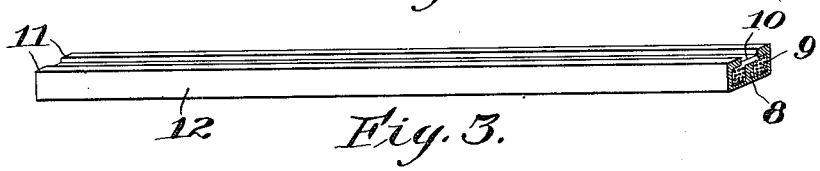
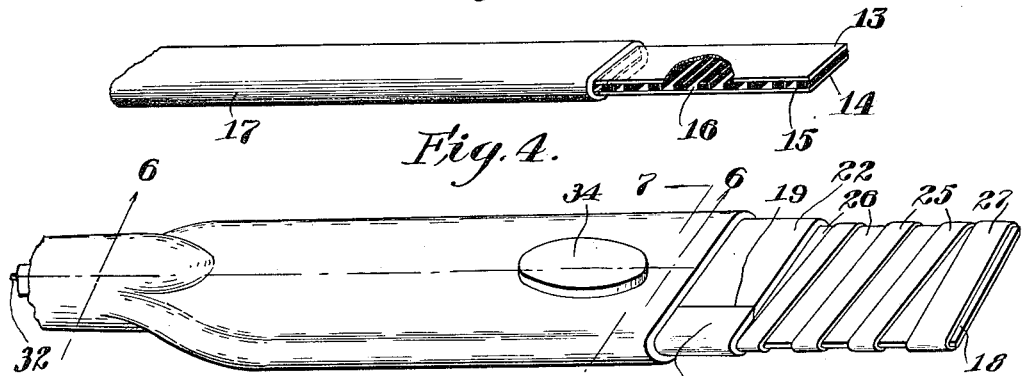
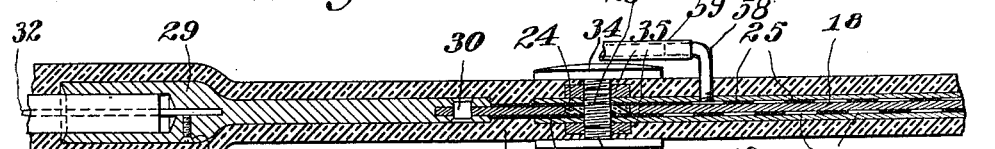
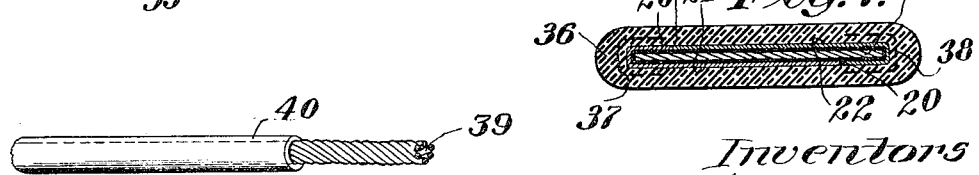
Inventors
Daniel F. Comstock
Leonard T. Troland
Joseph A. Ball
by Roberts, Roberts & Cushman
their Attorneys May 11, 1926.

WAVE DETECTOR

Filed Feb. 25, 1920   2 Sheets-Sheet 2

1,584,613

Inventors
Daniel F. Comstock
Leonard T. Troland
Joseph A. Ball
by Roberts Roberts & Cushman
their Attorneys Patented May 11, 1926.

1,584,613

UNITED STATES PATENT OFFICE.

DANIEL F. COMSTOCK, OF CAMBRIDGE, LEONARD T. TROLAND, OF MALDEN, AND JOSEPH A. BALL, OF WOLLASTON, MASSACHUSETTS, ASSIGNORS TO KALMUS, COMSTOCK & WESCOTT, INCORPORATED, OF BOSTON, MASSACHUSETTS, A CORPORATION OF MASSACHUSETTS.

WAVE DETECTOR.

Application filed February 25, 1920. Serial No. 361,223.

This invention relates to the detection of wave disturbances and more particularly to a sound detector which is responsive or unresponsive to sound waves depending upon their direction of propagation relative to the detector. The invention is particularly adapted to the detection of submarine sounds but is applicable to the detection of wave disturbances in media other than water.

In detecting wave disturbances, particularly faint sounds, great difficulty has been experienced when relatively heavy disturbances are produced in the vicinity of the receiving station. This difficulty is particularly troublesome in the case of submarine detectors located on shipboard where the noises produced on and by the ship are usually of much greater intensity than the sounds to be detected. Indeed the ship noises are usually of such relative intensity that it is necessary to stop the ship to detect signals or other sounds, and even then the noise of waves beating against the ship is frequently so great as seriously to interfere with the detection of other sounds.

The principal objects of the invention are to provide means which will indicate the direction of a source of sound or other wave disturbance and which will be unresponsive to waves traveling in other than a certain direction relatively thereto. Thus, when employed on shipboard to detect a source of sound, the detector will not only locate the direction of the source of sound but, when properly arranged relatively to the ship, will be undisturbed by the sounds produced on and by the ship. Submarine sound detectors carried by a moving ship are often towed behind the vessel, and in this case the wake is a source of disturbing sound; the construction of our detector is such as to eliminate or greatly reduce the effect of the wake sounds upon the detector when towed.

To the end of attaining the aforesaid and other objects a detector is provided which is differently affected by waves incident thereto from certain directions so that the effects of such waves are opposed and counteractive. Sounds striking the detector from such directions are ineffective not because the detector is insensitive to such sound waves but because the waves are caused to counteract each other in such manner that the net effect on the detector is wholly or practically nil.

The main characteristic of the improved detector is that it is linear in function, that is, it is sensitive to waves at a plurality of points disposed in a line, and is so arranged that when simultaneously affected in the same way at the various points the effects are cumulative and may be rendered perceptible by suitable indicating apparatus but when concomitantly affected in opposite sense at the various points the effects are differential and produce no effect upon the indicating apparatus. In order to render the detector linear in function it is preferably made elongate in structure as will hereinafter more fully appear.

Sound is propagated through water or other elastic medium in the form of waves having phases of alternate condensation and rarefaction. According to the present invention this fact is utilized to produce opposite effects on the linear detector above referred to, the detector being affected oppositely by the condensed and rarefied portions of the waves. When the various sensitive points or regions of the detector are simultaneously affected by the same phase of a wave the effects are additive and an indication is produced but when the sensitive points or regions are concomitantly acted upon in part by condensation phases and in part by rarefication phases the effects are subtractive and no indication is produced.

Thus for selectively detecting sound waves we arrange our linear detector so that the respective sensitive points or regions are oppositely responsive to condensations and rarefactions. When sound waves travel longitudinally of the detector the sensitive points or regions are, at any instant, subjected in part to condensations and in part to rarefactions, the detector being one or more wave lengths long, with no net effect upon the indicator. But when plane waves (that is, waves having a substantially flat or plane front as when coming from a considerable distance) strike the detector broadside all of the sensitive points or regions are simultaneously subjected to condensation or rarefaction with an alternating effect upon the indicator.

As above stated differential responsiveness with respect to direction of sound propagation is obtained according to the present invention by means of what may be described as a linear construction. A series of receivers or sensitive elements are arranged along a line or in a chain. When this line is straight, as it should be in general for the best operation, it constitutes the axis of the detector. The sensitive elements may consist of individual microphonic or transmitting units, of any sort, or may simply be ideal components of a continuous, sensitive string or rope. The separate responses of these elements are added algebraically at each instant by means of appropriate electrical connections, or other means.

Such a linear detector will be relatively insensitive to all sounds except those which have approximately plane wave-fronts and which strike it approximately broadside, that is, which strike it so that corresponding portions of the wave-front impinge upon different sensitive elements approximately at the same instant. Under these conditions the effects produced upon all of the sensitive elements will be summated arithmetically and will produce a maximally powerful effect upon the final indicator, such as a telephone receiver. However, in the case of sound waves which do not fulfill the above conditions, there will be interference between the contributions of the individual sensitive elements in their effect upon the final indicator. Hence the response of the whole linear system to such sounds will be less the more their direction of propagation deviates from a line perpendicular to the axis of the system, or the closer it comes to coincidence with the axis in question.

Theoretical analysis shows that such a linear detector is strictly selective only for plane waves having a length equal to that of the detector along its axis, or a length of which the detector length is an integral multiple. Even this degree of selectivity is theoretically perfect only when the elements of the detector are strictly continuous with one another. However, the same analysis shows that the selectivity can be increased indefinitely by increasing the detector length and the density of packing of the elements. In actual practice a high degree of direction selectivity can be obtained with reasonable lengths of continuously sensitive construction.

The linear detector may be resistance-varying, magnetic or electrostatic, but is preferably electrostatic, all as will appear from the following description and the accompanying drawings, in which—

Figure 1 is a side view of one embodiment of a linear detector of the resistance-varying type;

Figure 2 is a perspective view of another linear detector of the resistance-varying type;

Figure 3 is a perspective view of an embodiment of a linear detector of the magnetic type;

Figure 4 is a perspective view of an embodiment of the invention which is of the electrostatic type;

Figure 5 is a perspective view of a preferred embodiment of the invention which comprises a detector of the electrostatic type;

Figure 6 is a partial longitudinal section taken on line 6—6 of Figure 5;

Figure 7 is a transverse section taken on the line 7—7 of Figure 5;

Figure 8 is a perspective view of a further embodiment of the electrostatic type of the invention;

Figure 9:
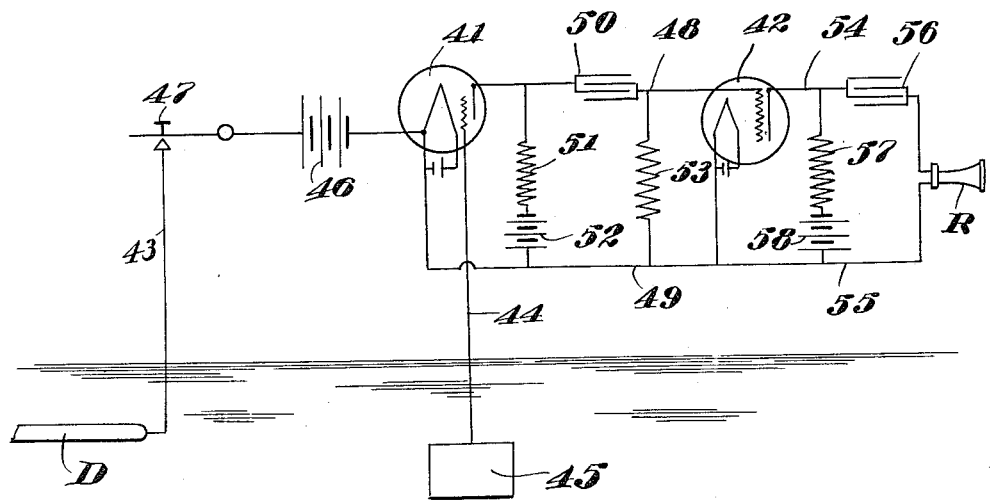
Figure 9 shows a circuit arrangement of the open-circuit type for use with either of the linear detectors of the electrostatic type.

The detector illustrated in Fig. 1 comprises a plurality of microphones M connected either in parallel or series but preferably in parallel to a pair of conductors 1 and 2 covered with insulation 3. When the device is employed under water the microphones M and the insulation 3 should be water-tight and water-proof. The spacing of the microphones is preferably uniform and when used to receive or locate a sound of a particular wave length the microphones are preferably spaced apart one-half the wave length and the number of microphones is preferably an even number.

The detector illustrated in Fig. 2 comprises a series of carbon blocks 4 disposed in a flexible rectangular tube 5, the blocks being arranged in two rows along the upper and lower sides of the tube respectively. The blocks of the respective rows are arranged in staggered relationship and the opposing faces of the blocks are made wedge-shaped so that the blocks interfit with each other as shown in the figure. The blocks 4 are connected at their opposite ends with conductors 6 and 7 which are intended to be connected in series with suitable indicating mechanism such as hereinafter described. The casing or tube 5 is formed of insulating material so that current entering through one of the conductors will flow through the carbon blocks in series and thence out through the other conductors, the blocks 4 of each row being spaced apart slightly so that the current is caused to follow a zigzag course passing through all of the blocks. It will be understood that the ends of the tubular casing 5 will be closed in such manner that water is excluded from the casing when submerged.

The embodiment of the linear detector shown in Fig. 3 comprises an elongate electromagnet comprising an elongate central core 8, a coil 9 horizontally encircling the core 8, and an elongate diaphragm 10 mounted at its opposite edges in the flanges 11 of the casing 12 disposed on opposite sides of a longitudinal opening in the upper side of the casing. The ends of the casing 12 would of course be closed to exclude water from the interior of the electromagnet and the coil 9 would be connected in series with an indicator as in the case of the detectors shown in Figs. 1 and 2. As the diaphragm 10 is moved inwardly or outwardly toward or from the core 8 the magnetic circuit of the coil 9 would be altered, thereby producing an alteration in the flow of current in the coil.

While the resistance and magnetic detectors above described may be employed with good results, a linear detector of the electrostatic type is more practical as it is much simpler in construction and more easily manufactured. Such a detector essentially comprises two or more elongate conducting surfaces with a dielectric material between them, so arranged that the conducting surfaces are free to move toward and away from each other in accordance with the physical effect of sound waves thereupon. These surfaces may be of any conducting substance and grouped in any fashion which will permit them to form a part of an electrical condenser. For example, one of the plates may consist of a water surface in contact with a dielectric such as rubber. The number of plates does not have to be an even number, provided the grouping is such as to form a condenser. Several examples of this electrostatic form of our detector are illustrated in Figs. 4 to 8. The electrostatic embodiment of the present invention constitutes its preferred form.

The detector shown in Fig. 4 comprises two conducting plates 13 and 14 held in parallel spaced relationship by threads or strips of insulating material 15 disposed between the two places in spaced parallel relation and a flattened tube 17 of flexible material surrounding the plates. The tube 17 must be either of insulating material or insulated from at least one of the plates and when employed under water must be waterproof and closed at the ends. The most satisfactory material for this purpose of which we are at present aware is flexible rubber. The two plates 13 and 14 are intended to be connected to the opposite sides of an indicator circuit as will be hereinafter described so that the capacity of the circuit will be varied when the plates move toward or from each other. In order to permit relative movement of the plates the insulating strips 15 may be of deformable material such as threads of soft rubber or the plates may be made thin and flexible or both, so that variation of the pressure on the outside of the tube 17 will produce a variation in the distance between the plates. Moreover, the plates are preferably sufficiently flexible to permit certain opposing portions of the two plates to move toward or from each other at the same time that other portions remain stationary or move in the opposite direction with respect to each other. The strips or threads 15 are separated from each other as at 16 to allow space for the deformation of the strips when pressure is applied to the plates 13 and 14.

In Figs. 5, 6 and 7 a preferred embodiment of the invention is illustrated, which comprises an inner elongate plate 18 surrounded by a flattened metallic tube which is divided longitudinally along lines 19 and 20 into two sections 21 and 22. The division 19 is disposed near one edge of the inner plate and the division 20 is disposed near the other edge of the inner plate so that the longer portions of the sections 21 and 22 overlap the central region of the inner plate. The two sections 21 and 22 are connected together both mechanically and electrically by a threaded stud 23 which passes through the central plate 18 and is insulated therefrom by means of a bushing 24. The plate 18 forms one condenser element and the sections 21 and 22 constitute the other condenser element, these parts preferably being formed of aluminum. The two condenser elements are separated from each other by a ribbon 25 of cellulose acetate or other suitable material wound spirally around the inner plate, the adjacent turns of the ribbon being spaced apart so as to leave free spaces 26 therebetween. At the ends of the plate 18 the plate may be separated from the sections 21 and 22 by broad bands of cellulose acetate wound around the plate 18 as indicated at 27 and 28.

At the upper end of the device (Figs. 4 and 5) a conducting head 29 is fitted over the plate 18 and secured thereto by means of rivets 30. The head 29 tapers upwardly to a socket 31 in which a conductor 32 may be secured by means of a screw 33, the conductor 32 serving to transmit electric current to and from the central condenser element 18. Current is transmitted to and from the outer condenser element 21—22 through a pair of broad headed screws 34 which are secured to the opposite sides of the condenser element 21—22 by means of connecting nuts 35 threaded upon the screws 34 and upon the stud 23.

Around the parts of the device already described is provided a covering 36 which is preferably formed of rubber vulcanized around the assembled device. While the covering 36 is being vulcanized over the device, pressure is supplied to the flat sides of the device so as to press the covering closely against the outer surfaces of the condenser sections 21 and 22. The vulcanized covering 36 is extended outwardly around the head 29 and over the lower end of the device so as to prevent any leakage of water into the device. Strips of canvas or the like are embedded in the rubber covering along the edges of the condenser elements, as shown at 37 and 38 in Figure 7 so as to prevent the edges of the flat condenser from cutting through the rubber envelope.

As the primary function of the insulating strip 25 is to keep the outer element of the condenser spaced from the inner element, it is preferably so arranged that it performs its spacing function while providing ample free spaces between the elements for permitting movement of the condenser elements relative to each other and for maintaining a gaseous dielectric of sufficient strength to afford efficient operation and sensitiveness of the detector. An insulating strip of cellulose acetate has been found by extensive experiments to be well suited for this purpose as it is sufficiently resistant to the temperature applied to the device during the process of vulcanizing the covering around the condenser elements, and does not deteriorate while in use. The surfaces of the cellulose strips are, due to the nature of the material, slightly crinkled and thereby form with the condenser elements which are in contact therewith, small air pockets. This condition enables the condenser elements to approach each other when the device is subjected to external pressure.

The use of a solid dielectric separating strip which is interposed between the condenser plates over a portion of their parallel areas only is an important feature for the satisfactory operation of the instrument. This arrangement places the solid and gaseous dielectric components in parallel rather than in series electrically, which is an advantage for the following reason. Any electrical leakage across the dielectric space will in general be greater through the gaseous portion than through the solid portion. This will be true especially in the case of a submarine detector, since it is to be expected that some moisture will be present in the gaseous portion of the dielectric and this will almost inevitably render this gaseous portion more conductive of the electricity than the solid portion.

Under these conditions, since the fraction of the total voltage of the device which is maintained across a given portion of the dielectric is proportional to the resistance of that portion, the solid portion will carry most of the voltage. It is the gaseous portion, however, which is subject to variation under the influence of the incident sound waves, and if this portion carries only a small part of the voltage the variation in its thickness will have only a small electrical effect upon the outside circuits, and the detector will be correspondingly inefficient. Our arrangement of the gaseous and solid components of the dielectric so that they are at least partially in parallel electrically rather than in series obviates this difficulty.

If considered desirable air or other fluid may be forced into the spiral space 26 between the inner plate 18 and the other element 21—22 in any suitable manner to regulate the sensitivity of the device. Moreover the hydrostatic pressure of the water may be counteracted by thus forcing air into the device in proportion to the depth to which the device is lowered into the water.

The detector shown in Fig. 8 which is also of the electrostatic type, comprises a cable of stranded wire 39 encased in a tube 40 of rubber or other flexible waterproof and insulating material. A layer of air is maintained between the tube and wire core owing to the fact that the tube only touches the core along the outer sides of the wires. This detector is of the single condenser element type, the water outside of the tube serving as the other condenser element.

Figure 10:
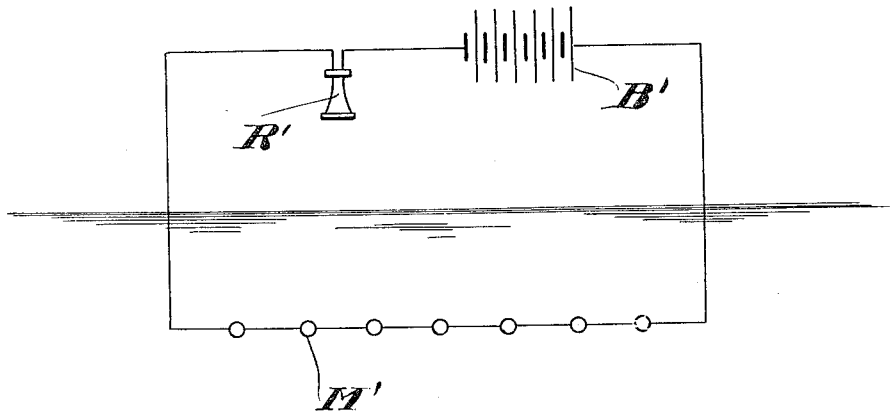
Figure 10 shows a circuit arrangement of the closed circuit type for use with either the resistance or magnetic types of linear detector.

While our improved detectors may be employed with indicator circuits of many kinds we preferably employ circuits such as shown in Figs. 9 and 10, the circuit shown in Fig. 9 being particularly adapted for use with detectors such as shown in Figs. 4 to 8 and the circuit shown in Fig. 10 being particularly adapted for use with detectors such as shown in Figs. 1 to 3.

The system shown in Fig. 9 comprises two audions 41 and 42 connected in tandem between the detector D and the receiver R. The input circuit of the audion 41 comprises conductors 43 and 44 connected respectively to the conducting element of the detector (18 or 29) and to a submerged plate 45. The input circuit also comprises a suitable source of voltage 46 for establishing a potential difference across the condenser elements of the system and a key 47 for closing the input circuit when receiving. The connections between the output terminals of audion 41 and the input terminals of audion 42 comprise conductors 48 and 49, condenser 50, resistance 51 and battery 52 connected in bridge of the conductors 48 and 49 on the input side of the condenser 50, and a resistance 53 connected in bridge of the conductors 48 and 49 on the output side of condenser 50.

The output side of audion 42 is connected in series with receiver R through conductors 54 and 55 and condenser 56 and a resistance 57 and battery 58 are connected in bridge of conductors 54 and 55 on the input side of condenser 56.

The system shown in Fig. 10 comprises a receiver R' and a battery B' connected in series with a linear detector of the type shown in Fig. 1 comprising a plurality of microphones M' connected in series. This system is also adapted to be used with detectors shown in Figs. 2 and 3 and with other detectors adapted to operate in a closed circuit.

The operation of the linear detector shown in Figs. 1 and 10 is as follows: When sound waves have traveled a considerable distance their wave front is substantially flat or plane, and when such waves strike the series of microphones M broadside the diaphragms of the microphones move inwardly and outwardly in unison, thereby functioning cumulatively to affect the indicator connected thereto. However, when sound waves travel longitudinally of the detector or obliquely thereto the microphones M will at any given instant be subjected in part to the condensation portions of the waves and in part to the rarefaction portions of the waves. The condensations will increase the pressure around the cable 3 and will force the diaphragms of the microphones subjected to the condensations inwardly. The rarefactions will produce a decrease in pressure on the microphones subjected thereto and the diaphragms of such microphones will therefore move outwardly. Inasmuch as the condensation and rarefactions are equal and opposite the decrease in resistance of the microphones subjected to the condensations will be equal to the increase in resistance in the microphones subjected to the rarefactions. Consequently the net resistance of the microphone circuit will remain substantially constant as the waves travel longitudinally of the detector, with the result that little or no effect will be produced in the indicator circuit.

The cancellation of the opposite effects produced on the microphones will be more nearly perfect, when the sound waves are traveling longitudinally of the detector, if the microphones are spaced by half wave lengths and if the total number of microphones is an even number. The total length of the detector does not fundamentally affect the mode of operation, but by making the total length exactly equal to one or more wave lengths the interference effect is rendered more perfect. Moreover, by increasing the length of the detector its capacity for detecting sounds striking it broadside is increased, whereas its unresponsiveness to waves traveling longitudinally thereof is not materially affected. Obviously the detector may be tuned more perfectly to exclude sound waves of any particular wave length by varying the distance between the microphones and by making the total length of the detector exactly equal to one or more wave lengths. For receiving sounds striking the detector broadside the diaphragms 15 should of course be directed toward the source of sound, but sound waves traveling longitudinally of the detector produce condensations and rarefactions entirely around the detector and the direction in which the diaphragms of the microphones are directed is immaterial.

The operation of the detector shown in Fig. 2 is similar to that shown in Fig. 1, the principal difference between the two detectors being that the microphonic contacts in Fig. 2 are disposed closer together than in Fig. 1. Indeed the microphonic contacts in Fig. 2 are practically continuous longitudinally of the detector and the capacity of the detector for a given length is therefore considerably greater. In using the detector in Fig. 2 as a submarine detector to receive sounds traveling horizontally the detector would be positioned with the blocks 4 disposed vertically. Thus with sound waves impinging on the vertical sides of the casing 5, which is relatively thin and flexible, the blocks of the respective rows would be moved toward and from each other, thereby varying the resistance at their contact surfaces and varying the current in the indicator circuit. However, sounds traveling longitudinally of the detector would produce around the casing 5 alternate regions of condensation and rarefaction and the carbon blocks would be forced together in the regions of condensation and would be permitted to move away from each other in the regions of rarefaction.

In this connection it will be understood that at all times the blocks 4 would be in contact with each other along their tapered faces and that the variation in pressure on the blocks would not permit the blocks to separate but would merely vary the pressure therebetween so as to vary the effective resistance thereof above and below the normal value. The casing 5 may be made of any suitable flexible and elastic material such as rubber or thin sheet steel, and the blocks may be secured at their rear faces to the sides of the casing so that they may be drawn apart by outward movement of the side walls of the casing as well as being forced together by inward movement of the side walls. When employing a steel tube the carbon blocks are insulated from the tube. The opposite effects produced along the detector by the condensations and rarefactions of waves traveling therealong counteract each other as in the case of the detector shown in Fig. 1 and the effect produced in the indicator circuit by such sounds is substantially nil.

The linear detector shown in Fig. 3 operates according to the principle of the original Bell telephone transmitter, and when plane sound waves strike the diaphragm 10 broadside the diaphragm is vibrated as a whole to and from the core 8, thereby producing alterations in the current in the detector circuit which is connected to the coil 9. However, when sound waves travel longitudinally of the detector, or obliquely thereto, thereby producing alternate regions of condensation and rarefaction therearound, the diaphragm 10 is moved inwardly in the regions of condensation and outwardly in the regions of rarefaction. The opposite movements of the different parts of the diaphragm produce opposite effects which substantially cancel each other. Obviously the diaphragm should be exceedingly thin and flexible to permit this opposite flexing and we propose to fill the casing 12 with air under pressure when employing the detector for submarine purposes, so as to counteract the pressure of the water on the outside of the diaphragm.

The operation of the electrostatic detector illustrated in Fig. 4 is as follows: Plane waves striking the detector approximately perpendicularly to its axis will cause the plates to move to and from each other as the detector is alternately subjected to condensations and rarefactions, this being true whether or not the waves strike the detector broadside of the plates 13 and 14 inasmuch as the effect is produced by change in pressure around the detector and not solely by direct impingement of waves against the side of the detector. Waves traveling longitudinally of the detector or obliquely thereto will affect alternate sections of the detector oppositely, as will be understood from the foregoing descriptions, and the total capacity of the detector will remain substantially unchanged. With the plates 13 and 14 respectively connected to conductors 43 and 44 of Fig. 9 or to the input circuit of any other indicating or recording system adapted to respond to variations in capacity, the device will pick up sounds approaching it approximately perpendicularly and will be substantially unresponsive to sounds reaching it at other angles.

The operation of the electrostatic detector shown in Figs. 5 to 7 is similar to that of Fig. 4 the two elements 18 and 21—22 being respectively connected to the opposite sides of the input circuit of the indicating system. One element 21—22 is connected through the screws 34 and the water surrounding the detector to one side of the circuit, and the other element or plate 18 is connected to the other side of the circuit as shown in Fig. 9. When the detector is subjected to alternate compressions and rarefactions the distance between the elements varies due to the provision of the spiral space 26 and due to the fact that small air pockets exist between the surfaces of the condenser elements and the spiral insulating strip 25. If the distance is varied in the same sense throughout the length of the detector the total capacity of the detector will be changed but if alternate sections are affected oppositely the total capacity will be substantially unaffected. Thus the devices will be responsive only to sounds traveling in certain directions and can therefore be used to locate the direction of a source of sound or to exclude interfering sounds coming from directions other than that of the sound to be received.

The operation of the electrostatic detector shown in Fig. 8 is similar to that of Fig. 4, but instead of having two plates respectively connected to the opposite sides of the input circuit of the indicating system, one plate 39 is connected to one side of the circuit and the other side of the circuit is connected to the water surrounding the detector as shown in Fig. 9. When the detector is subjected to alternate compressions and rarefactions the distance between the outside water and the inside plate varies, due either to variation in the thickness of the tube surrounding the inner conductor or to movement of the tube to and from the conductor or both.

In utilizing our invention for submarine signaling or for the detection of submarine sounds the linear detector will be positioned as shown in Figs. 9 and 10. If the direction of the source of sound to be detected is known the detector will be disposed broadside of the path of the sound waves. If there is any particular disturbing sound or noise the detector will not only be disposed broadside of the source of sound but will also be arranged in alinement with the source of disturbance. Thus when employed on shipboard to detect submarines or the like the detector will be arranged in alinement with the ship, so as to be unaffected by the noises produced on and by the ship, and will be disposed broadside of the submarine. If the location of the submarine were known the detector would be orientated until the sound of the submarine were heard, the detector being maintained in alinement with the ship during the orientation. A convenient way of associating the detector with a ship is to permit it to trail in the water behind the ship. The orientation of the detector could be altered by changing the course of the ship. When employing a detector of the type illustrated in Fig. 8 the detector could be reeled up or led out at will. Likewise it could be made of any desired length, even to the extent of several hundred feet.

If desired, the selectivity can be increased by interposing between the linear detector and the final indicator, a tuned or resonated system, electrical or otherwise, which augments vibrations of a frequency corresponding to a wave-length equal to the detector length, and suppresses other vibrations.

We have found that a detector constructed to operate on the condenser principle, using rubber as the dielectric will often operate without an outside source of voltage. This "self-activity" is due to a state of electrification or electrical strain produced in the rubber by the process of pulling it on to the metal core. It gradually disappears with time, but can be regenerated by stretching or kneading the rubber. The effect is often equivalent to the presence of a charging voltage of considerable intensity.

We claim:

1. The method of determining the direction of propagation of wave disturbances which comprises arranging a detector, at least approximately one wave length long so that waves incident thereto in one direction will produce a cumulative effect and so that successive waves incident thereto in another direction will produce a differential effect and orientating the detector to produce variations in the two effects.

2. The method of determining the direction of propagation of sounds which comprises arranging a detector, at least approximately one wave length long, so that sound waves incident thereto in one direction will produce a cumulative effect and so that successive sound waves incident thereto in another direction will produce a differential effect and orientating the detector to produce variations in the two effects.

3. Apparatus for receiving wave disturbances traveling in certain directions only comprising an elongate detector at least approximately one wave length long and sensitive to wave disturbances at a plurality of spaced points therealong and arranged so that the effects at the various points produced by a wave disturbance traveling therealong will be opposite to each other.

4. Apparatus for receiving wave disturbances traveling in certain directions only comprising an elongate detector at least approximately one wave length long and sensitive to sound waves at a plurality of spaced points therealong and an indicator for manifesting the effects produced on the detector by sound waves, the detector being so arranged that sound waves traveling longitudinally of the detector act differentially upon the detector and produce substantially no effect upon the indicator.

5. Apparatus for receiving wave disturbances traveling in certain directions only comprising an elongate detector sensitive to waves at a plurality of spaced points therealong, the detector being at least one wave length long, and an indicator for manifesting the effects produced upon the detector by wave disturbances, the detector being so arranged that waves traveling longitudinally of the detector act differentially upon the detector and produce substantially no effect upon the indicator.

6. Apparatus for receiving wave disturbances traveling in certain directions only comprising an elongate detector sensitive to waves at a plurality of spaced points therealong, the detector being many wave lengths long, and an indicator for manifesting the effects produced upon the detector by sound waves, the detector being so arranged that waves traveling longitudinally of the detector act differentially upon the detector and produce substantially no effect upon the indicator.

7. Apparatus for receiving wave disturbances traveling in certain directions only comprising an elongate detector sensitive to wave disturbances at a plurality of points therealong, the detector being oppositely responsive at the respective points to opposite phases of the waves traveling longitudinally thereof, and an indicator so associated with the detector as to manifest the algebraic sum of the effects produced at the respective points at any instant by the negative and positive portions of the waves, the detector being at least one wave length long so that waves traveling longitudinally thereof will simultaneously produce opposite effects thereupon, thereby producing little or no effect upon the indicator.

8. Apparatus for receiving sounds traveling in certain directions only comprising an elongate detector sensitive to sound waves at a plurality of points therealong, the detector being oppositely responsive at the respective points to opposite phases of the waves traveling longitudinally thereof, and an indicator so associated with the detector as to manifest the algebraic sum of the effects produced at the respective points at any instant by the negative and positive portions of the waves, the detector being at least one wave length long so that waves traveling longitudinally thereof will simultaneously produce opposite effects thereupon, thereby producing little or no effect upon the indicator.

9. Apparatus for receiving wave disturbances traveling in certain directions only comprising an elongate detector continuously sensitive to wave disturbances throughout at least a portion of its length, the detector being oppositely responsive to opposite phases of the waves traveling longitudinally thereof throughout the sensitive portion thereof, and an indicator connected to the detector so as to integrate the effects produced throughout said sensitive portion by the negative and positive portions of the waves, the detector being at least one wave length long so that waves traveling longitudinally thereof will simultaneously produce opposite effects thereupon, thereby producing little or no effect upon the indicator.

10. Apparatus for receiving sounds traveling in certain directions only comprising an elongate detector continuously sensitive to sound waves throughout at least a portion of its length, the detector being oppositely responsive to opposite phases of the waves traveling longitudinally thereof throughout the sensitive portion thereof, and an indicator connected to the detector so as to integrate the effects produced throughout said sensitive portion by the negative and positive portions of the waves, the detector being at least one wave length long so that waves traveling longitudinally thereof will simultaneously produce opposite effects thereupon thereby producing little or no effect upon the indicator.

11. Apparatus for receiving wave disturbances traveling in certain directions only and for determining the direction of propagation of wave disturbances comprising an elongate electrostatic transmitter continuously sensitive to sound waves throughout at least a portion of its length, the transmitter being oppositely responsive to opposite phases of the waves traveling longitudinally thereof throughout the sensitive portions thereof, and an indicator connected to the transmitter so as to integrate the effects produced throughout said sensitive portion by different phases of the waves, the transmitter being many wave lengths long so that waves traveling longitudinally thereof will simultaneously produce opposite effects thereupon, thereby producing little or no effect upon the indicator.

12. An apparatus for receiving submarine wave disturbances traveling in certain directions only and for determining the direction of propagation of wave disturbances comprising an elongate conductor at least approximately one wave length long and a compressible tube of dielectric material surrounding the conductor.

13. A wave-disturbance detector comprising an inner condenser element, an outer condenser element on each side of said inner element, means for maintaining said elements in spaced relationship, and means extending through said inner element connecting said outer elements together.

14. A linear sound detector selectively responsive to sound disturbances as regards their direction of propagation comprising an inner condenser element, an outer condenser element on each side of said inner element, means for maintaining said elements in spaced relationship, and means extending through said inner element connecting said outer elements together.

15. A wave-disturbance detector comprising an inner conducting element, an outer conducting element, and a ribbon of non-conducting material wound spirally around said inner element so as to space said elements apart, the adjacent turns of the spirally wound ribbon being spaced apart so as to leave free spaces therebetween.

16. A linear sound detector selectively responsive to sound disturbances as regards their direction of propagation comprising an inner conducting element, an outer conducting element, and a ribbon of non-conducting material wound spirally around said inner element so as to space said elements apart, the adjacent turns of the spirally wound ribbon being spaced apart so as to leave free spaces therebetween.

17. A wave-disturbance detector comprising an inner condenser element, a ribbon of cellulose acetate wound around said inner element with adjacent turns spaced apart, and an outer condenser element surrounding said spirally wound ribbon.

18. A linear sound detector selectively responsive to sound disturbances as regards their direction of propagation comprising an inner condenser element, a ribbon of cellulose acetate wound around said inner element with adjacent turns spaced apart, and an outer condenser element surrounding said spirally wound ribbon.

19. A wave-disturbance detector comprising an inner conducting element, an outer conducting element, substantially surrounding said inner element and a ribbon of non-conducting material wound spirally around said inner element so as to space said elements apart, the adjacent turns of the spirally wound ribbon being spaced apart so as to leave free spaces therebetween.

20. A linear sound detector selectively responsive to sound disturbances as regards their direction of propagation comprising an inner conducting element, an outer conducting element, substantially surrounding said inner element and a ribbon of non-conducting material wound spirally around said inner element so as to space said elements apart, the adjacent turns of the spirally wound ribbon being spaced apart so as to leave free spaces therebetween.

21. A wave-disturbance detector comprising a plurality of condenser elements, means for yieldingly maintaining said elements in spaced relationship so that they may move toward and from each other, and a flexible covering enveloping said elements, said covering conforming to the shape of the assemblage of elements, whereby variations in pressure in the surrounding medium may be transmitted through the covering to the condenser elements upon a plurality of sides of the detector.

22. A linear sound detector selectively responsive to sound disturbances as regards their direction of propagation comprising a plurality of condenser elements, means for yieldingly maintaining said elements in spaced relationship so that they may move toward and from each other, and a flexible covering enveloping said elements, said covering conforming to the shape of the assemblage of elements, whereby variations in pressure in the surrounding medium may be transmitted through the covering to the condenser elements upon a plurality of sides of the detector.

23. A wave-disturbance detector comprising a plurality of condenser elements, means for yieldingly maintaining said elements in spaced relationship so that they may move toward and from each other, and a rubber covering vulcanized around said elements and conforming to the contour of the assemblage of elements.

24. A linear sound detector selectively responsive to sound disturbances as regards their direction of propagation comprising a plurality of condenser elements, means for yieldingly maintaining said elements in spaced relationship so that they may move toward and from each other, and a rubber covering vulcanized around said elements and conforming to the contour of the assemblage of elements.

25. A wave-disturbance detector at least one wave length long comprising a plurality of condenser elements, means for yieldingly maintaining said elements in spaced relationship so that they may move toward and from each other, and a rubber covering vulcanized around and enveloping said elements throughout their entire length and conforming to the contour of the assemblage of elements.

26. A linear sound detector at least one wave length long selectively responsive to sound disturbances as regards their direction of propagation comprising a plurality of condenser elements, means for yieldingly maintaining said elements in spaced relationship so that they may move toward and from each other, and a rubber covering vulcanized around and enveloping said elements throughout their entire length and conforming to the contour of the assemblage of elements.

27. A wave-disturbance detector comprising an inner condenser plate, outer condenser plates on either side of said inner plate, a rubber casing vulcanized around said outer plates, and a conductor extending through said plates in contact with said outer plates and through said casing so as to be exposed to the surrounding media.

28. A linear sound detector selectively responsive to sound disturbances as regards their direction of propagation comprising an inner condenser plate, outer condenser plates on either side of said inner plate, a rubber casing vulcanized around said outer plates, and a conductor extending through said plates in contact with said outer plates and through said casing so as to be exposed to the surrounding media.

Signed by us at Boston, Massachusetts, this 27th day of August, 1919.

DANIEL F. COMSTOCK.
LEONARD T. TROLAND.
JOSEPH A. BALL.